June 3, 1969  N. DAVIS  3,447,595

ENVIRONMENTAL GROWTH CHAMBER

Filed Aug. 14, 1967

INVENTOR.
NOEL DAVIS

BY
Meyer, Tilberry & Body
ATTORNEYS.

United States Patent Office 3,447,595
Patented June 3, 1969

3,447,595
ENVIRONMENTAL GROWTH CHAMBER
Noel Davis, Russell Township, Geauga County, Ohio, assignor to Integrated Development and Manufacturing Co., Chagrin Falls, Ohio, a corporation of Ohio
Filed Aug. 14, 1967, Ser. No. 660,344
Int. Cl. F24f 3/14, 7/00, 13/00
U.S. Cl. 165—21                                                    4 Claims

ABSTRACT OF THE DISCLOSURE

An environmental growth chamber of the type used in conducting biological experiments. The growth chamber comprises a well insulated housing defining a test chamber provided with apparatus for maintaining controlled conditions of temperature and humidity therein. Positioned over the upper end of the test chamber is a light cap formed with highly reflective interior walls defining a downwardly open lamp chamber with a plurality of closely spaced electric lamps mounted therein. A pair of horizontally extending, vertically spaced, light pervious barrier members are positioned between the test chamber and the lamp chamber and arranged to provide an air seal between the respective chambers. Additionally, the barrier members are mounted so as to have a relatively sealed air space between them.

---

The present invention is directed toward the art of environmental growth control chambers and, more particularly, to an improved light cap and barrier member construction.

Environmental growth control chambers are widely used for performing biological experiments. As discussed in my copending United States patent application S.N. 621,493, filed Mar. 8, 1967, these chambers must be capable of closely controlling environmental variables such as temperature, humidity, air flow, and light.

Broadly, the chambers have normally comprised a well insulated housing defining a test chamber provided with various temperature and humidity modifying devices, air circulating fans, and a source of high intensity light.

Because of the necessity of providing an extremely high intensity of light within the test chamber, the housings generally had a structure known as a "light cap" positioned on their upper end. This structure included a housing forming a downwardly open lamp chamber having a large number of closely spaced fluorescent and/or incandescent lamps mounted therein.

Because of the large number of lamps required, a substantial amount of heat was generated in the lamp chamber. In order to reduce heat flow from the lamp chamber to the test chamber, a light pervious barrier member, such as a sheet of Plexiglas, was mounted between the respective chambers.

Although the above-described arrangement was generally satisfactory, the heat flow between the chambers was quite high, and the load on the temperature modifying apparatus was correspondingly high. Additionally, other problems arose under certain operating conditions. For example, during periods when there was a temperature differential between the interior of the lamp chamber and the interior of the test chamber, coupled with proper humidity conditions in one or the other, condensation or "fogging" took place on the barrier member. For example, when the interior of the chamber was being maintained at a relatively low temperature and air of moderately high humidity was circulating through the light cap, condensation often took place on the lamp chamber surfaces of the barrier member. As a result of this condensation, light transfer through the barrier member was impeded causing reduced and varying light intensity within the chamber.

Further, the relatively high heat loss through the single barrier made it more difficult to obtain high relative humidities within the test chamber. As can be seen, with high heat flow from the lamp chamber into the test chamber, the cooling coil is required to operate at a relatively low temperature compared to the required test chamber air temperature. Consequently, the flow of the air across the cooling coil can produce condensation of the moisture in the air and resultant dehumidification.

Although it is well known to reduce heat flow through windows by the use of double sheets of glass with a dead air space therebetween, this expedient was not deemed advisable in environmental growth chamber construction. The primary reason for this was that the additional sheet resulted in a substantial reduction in the level of light within the test chamber. For example, Plexiglas is considered optically pure; however, a light loss by reflection of approximately 8% occurs during passage through a single sheet. Consequently, the use of a double layer would have been expected to result in light losses in the range of 16–20%.

Because an extremely high level of light intensity must be maintained within the test chamber, light losses in the noted range are very objectionable. For this reason, the heat losses resulting when a single layer of Plexiglas was used were deemed preferable to the light losses resulting from the use of a double layer.

The present invention however, provides an improved environmental growth chamber construction which permits a double layer barrier to be utilized without any meaningful loss of light level within the test chamber. Because of the arrangement provided, there is an elimination of condensation problems and a reduction in load on the test chamber's temperature modifying apparatus. Consequently, temperature, light and humidity conditions within the chamber are more easily maintained at the desired levels.

Further, because the arrangement reduces the heat flow into the chamber, the necessary cooling coil to air temperature differential is reduced, thereby raising the humidity controlling dewpoint. Consequently, with the present invention it is possible to maintain higher relative humidities within the test chamber.

In accordance with the present invention, an environmental growth chamber of the general type described is provided with an improved light cap arrangement which includes a pair of horizontally extending, vertically spaced, light pervious barrier members positioned between the lamp chamber and the test chamber. The barrier members are arranged to provide an air seal between the test chamber and the lamp chamber and are mutually sealed between their outer edges to provide a sealed air space between them. Additionally, the interior surfaces of the lamp chamber are provided with a highly reflective finish.

By utilizing a pair of barrier members positioned as described, the heat transfer between the light cap and the growth chamber is materially reduced and the temperature gradient through the double barrier arrangement is such that the temperature of the surfaces of the members will not normally fall below the dewpoint temperature of the air in the respective chambers. Further, the tendency of the double barrier to reduce the transmission of light into the test chamber is compensated for by providing the interior of the lamp chamber with a mirror finish. In this manner, the prior problems of condensation and heat loss are overcome without any noticeable reduction in the level of light intensity within the chamber.

Accordingly, a primary object of the present invention is the provision of an environmental growth chamber which is arranged to eliminate problems of heat transfer between the lamp chamber and the test chamber without reduction in the level of light in the test chamber.

An additional object is the provision of an environmental growth chamber construction which eliminates problems of condensation on the light transmissive barrier between the lamp chamber and the test chamber.

A further object is the provision of an environmental growth chamber wherein the desired temperature and humidity conditions within the test chamber are more easily maintained.

A still further object of the invention is the provision of an environmental growth chamber construction which permits higher relative humidities to be maintained.

These and other objects and advantages will become apparent from the following description used to illustrate a preferred embodiment of the invention when read in connection with the accompanying drawings wherein.

Figure 1:
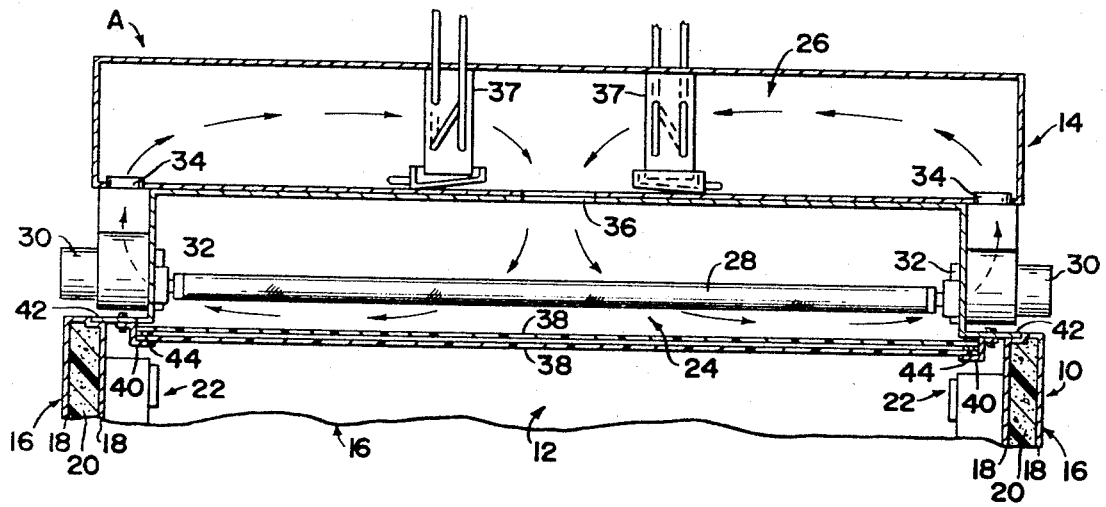
FIGURE 1 is an elevational cross-sectional view of the top portion of an environmental growth chamber construction in accordance with the present invention.
Figure 2:
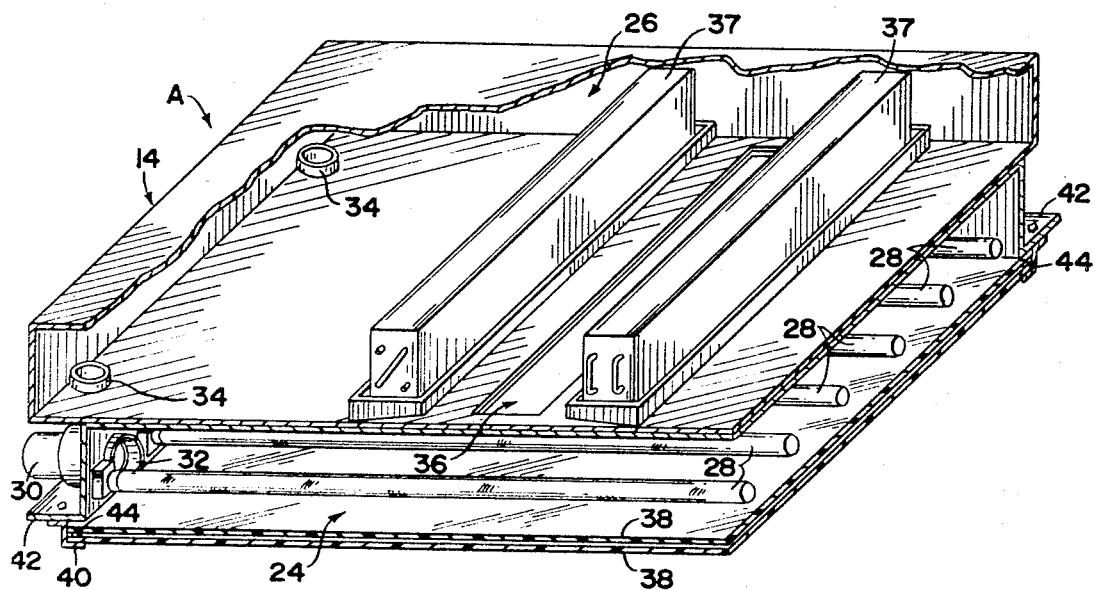
FIGURE 2 is a partial pictorial view of the construction shown in FIGURE 1 with portions broken away to more clearly show the novel features.

Referring now to the drawings wherein the showings are for the purpose of illustrating a preferred embodiment of the invention only and not for the purpose of limiting same, FIGURE 1 shows the overall arrangement of an environmental growth chamber A constructed in accordance with the present invention. As shown, the growth chamber includes a main, well insulated, housing structure 10 which defines a test chamber 12. The upper end of housing 10 is closed by a light cap 14. Light cap 14 provides the necessary high intensity light required for conducting experiments within the interior of test chamber 12.

The exact manner of construction of housing 10 is not important to the present invention; however, the housing is preferably formed in the manner described in my copending application Ser. No. 621,493 filed Mar. 8, 1967. As discussed in that application, housing 10 is preferably comprised of four vertically extending walls 16 each formed from a pair of aluminum sheets 18 bonded to a core of polystyrene foam 20. The usual doors or access openings (not shown) are provided for entrance to, and exit from, the test chamber.

Because it is necessary to closely maintain environmental conditions within the test chamber 12, temperature and humidity modifying apparatus 22 is provided. As discussed in the aforementioned patent application, this apparatus usually includes thermostatically controlled, heating and cooling coils, a humidifier, and fans for maintaining a constant circulation of air through the chamber and over the temperature and humidity modifying apparatus. Although not critical to the present invention this apparatus is preferably constructed in accordance with the teachings of my previously noted patent application. According to said application, the temperature and humidity modifying apparatus is positioned in a self-contained housing removably mounted within the test chamber.

As previously mentioned, positioned across the open end of housing 10 is a light cap 14. The light cap is arranged to provide a high intensity source of light for the interior of test chamber 12. Preferably this light cap must provide an illumination level of above 3,000 foot candles within the test chamber. Although the light cap can be formed as an integral part of the housing 10 and cooled by blowing ambient air therethrough, it is shown as an independent structure which is removable from the top of the housing and provided with a closed loop air cooling system. As disclosed in my copending application. Ser. No. 566,991 filed July 21, 1966, now Patent No. 3,393,728 the cap comprises a generally rectangular shaped housing defining a lamp chamber 24 and a lamp cooling chamber 26. Preferably the housing is formed from sheet aluminum and is arranged to sealingly rest on the upper edges of the walls 16.

In order to provide the necessary high intensity light a plurality of closely spaced horizontally extending fluorescent lamps 28 are mounted within the lamp chamber. Additionally, although not shown, incandescent bulbs are often used in conjunction with the fluorescent tubes.

Because fluorescent tubes function most efficiently at certain specific temperatures, and because of the need for maintaining the temperatures within the test chamber 12 closely regulated, means are provided for maintaining a continuous circulation of cooling air through the lamp chamber. These means comprise a plurality of centrifugal blowers or fans having their inlets 32 connected to the opposite ends of the lamp chamber and their outlets 34 connected with the opposite ends of the cooling chamber. A transversely extending opening 36 connects to the cooling chamber with the lamp chamber to permit a continuous recirculation of air in the manner shown by the arrows in FIGURE 1. The air is cooled during its passage through the cooling chamber by a pair of heat exchangers 37. The heat exchangers are shown as comprised of a plurality of simuously bent tubes covered with closely spaced heat exchanger fins. Although not shown, the supply of cooling fluid to the heat exchangers 37 is thermostatically regulated by conventional thermostatic control means responsive to the temperature of the air circulating through the light cap.

As discussed previously, in order to maintain the circulation of air through the light cap and the circulation of air through the test chamber entirely separate, as well as, to prevent the transfer of heat from the lamp chamber to the growth chamber, it has been the practice to seal between the open lower end of the lamp chamber and the upper end of the test chamber by the use of a horizontally extending sheet of light transmissive material. Preferably, this sheet has been formed from ⅛" thick Plexiglas.

This single sheet has been generally satisfactory; however, as previously mentioned, the heat transfer through it was substantial and problems were experienced with condensation and "fogging" on the barrier member. The fogging problems were especially acute when the test chamber was being used as a "cold chamber." At such times the chamber is maintained at temperatures in the range of 40° F. Normally, the lamp chamber is maintained at temperatures substantially higher to keep the lamps at their optimum temperature and obtain maximum light output (e.g. in the range of 105° F.). Because the barrier sheet was cooled by the air in the test chamber, the top surface of the sheet was often at a temperature below the temperature of the air in the lamp chamber. Often this sheet temperature fell below the dew point of the air in the lamp chamber and moisture condensed on the sheet. As a consequence of the condensation, light transmission through the sheet was impeded and the intensity of the light present within the test chamber was reduced and varied depending upon the amount of condensation. Additionally, a high degree of heat transfer took place from the lamp chamber into the test chamber. Further the cooling equipment in the test chamber was required to run substantially more than was ideally necessary.

The present invention overcomes these problems by providing a barrier arrangement which includes a pair of horizontally extending relatively closely spaced sheets of light transmissive material 38 arranged to provide an air tight seal between the lamp chamber and the test chamber. According to the preferred embodiment, the sheets are ⅛" thick sheets of Plexiglas spaced ¼" apart; however, it is apparent that other thicknesses and spacings can be used.

Although the exact manner of mounting the sheets could be varied, they are shown as being connected to the lower end of the light cap by Z shaped aluminum extrudings 40 which extend continuously around the outer edge portions of the sheets. The upper flange of each of the extrudings is bolted or otherwise connected to the horizontally extending lower flanges 42 of the light cap. Additionally, the air space between the sheets 38 is somewhat sealed by a gasket or spacer member 44 positioned therebetween. In this manner, a dead air insulating space is provided therebetween the sheets 38.

In one installation where the previously used single sheet of 1/8" thick Plexiglas once replaced by two 1/8" thick sheets spaced 1/4" apart, the heat transfer from the test chamber was reduced by more than 40%. Additionally, even with the test chamber operated at relatively lower temperatures no problems of condensation or "fogging" were encountered.

Although, as previously mentioned, Plexiglas is generally considered to be optically pure, there is a light loss of approximately 8% during passage through a single sheet. This light loss is caused by reflection at each surface. To overcome the increased light loss resulting from the use of two sheets of Plexiglas, the present invention provides a highly reflective finish on the interior surfaces of the lamp chamber. Although a variety of materials or surfaces could be used to give the required finish, by forming the lamp chamber from aluminum sheets and highly polishing their surface, the loss of light by reflection from the Plexiglas is substantially entirely overcome. In this manner, the advantages of the double-walled barrier are achieved without significant loss in light intensity within the test chamber. Accordingly, it is apparent that the present invention provides a substantially improved environmental growth chamber.

Having thus described my invention, I claim:

1. In an environmental growth chamber including: a well insulated housing forming a test chamber and provided with means for maintaining controlled conditions of temperature and humidity therein; a light cap positioned on the upper end of said test chamber and a downwardly open lamp chamber provided with a plurality of lamps therein adapted to maintain a high level of light intensity in said test chamber; and, means for providing a continuous recirculation of cooling air through said light cap; the improvement comprising: a pair of horizontally extending, vertically spaced, light pervious barrier members positioned between said test chamber and said lamp chamber and arranged to prevent air circulation between said respective chambers, and means between the outer edges of said barrier members for providing a relatively sealed air space therebetween; and, the interior surfaces of the lamp chamber being provided with a highly reflective finish.

2. The improvement as defined in claim 1 wherein the barrier members are Plexiglas sheets.

3. The improvement as defined in claim 1 wherein said lamp chamber is formed from aluminum having a highly polished surface.

4. The improvement as defined in claim 1 wherein said barrier members each comprise a thin sheet of light transmissive plastic supported from said light cap.

References Cited

UNITED STATES PATENTS

| 2,008,345 | 7/1935 | Blanchford | 126—200 |
| 3,192,575 | 7/1965 | Rosenau et al. | 126—200 XR |
| 3,255,342 | 6/1966 | Seitz et al. | 240—41.15 XR |
| 3,372,739 | 3/1968 | Kastovich et al. | 98—40 XR |

MILTON KAUFMAN, *Primary Examiner.*

M. ANTONAKAS, *Assistant Examiner.*

U.S. Cl. X.R.

98—40